INVENTOR
Joseph J. Osplack
BY
ATTORNEYS

Jan. 8, 1957 J. J. OSPLACK 2,776,529
DIAMOND STUDDED ABRASIVE WHEEL DRESSING TOOL
Filed April 2, 1953 3 Sheets-Sheet 2
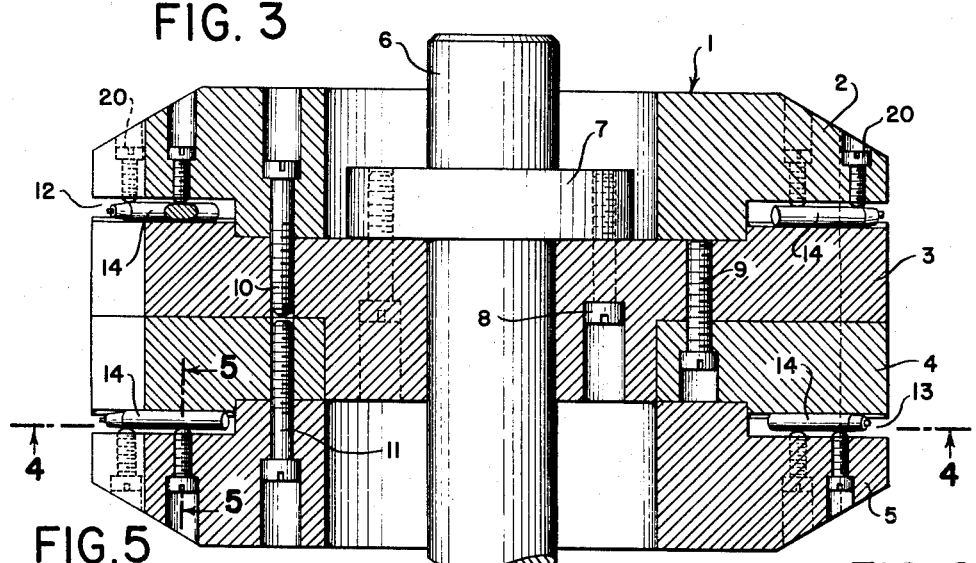
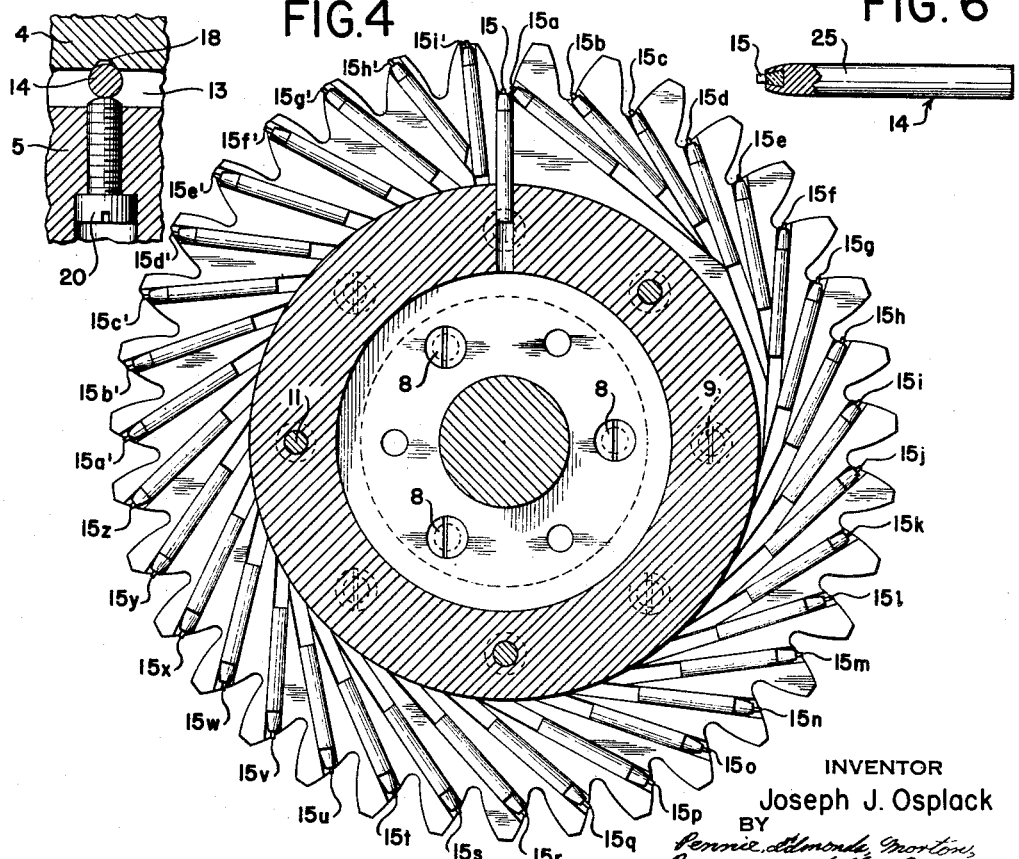
INVENTOR
Joseph J. Osplack
BY
ATTORNEYS Jan. 8, 1957  J. J. OSPLACK  2,776,529
DIAMOND STUDDED ABRASIVE WHEEL DRESSING TOOL
Filed April 2, 1953  3 Sheets-Sheet 3

INVENTOR
Joseph J. Osplack
BY
ATTORNEYS

United States Patent Office 2,776,529
Patented Jan. 8, 1957

2,776,529

DIAMOND STUDDED ABRASIVE WHEEL DRESSING TOOL

Joseph J. Osplack, Detroit, Mich., assignor to Vinco Corporation

Application April 2, 1953, Serial No. 346,355

5 Claims. (Cl. 51—287)

This invention relates to hobbing grinding wheel dressing tools and the method of using the same and more particularly to hobbing grinding wheel dressing tools adapted for use in the dressing of wheels used in the grinding of, for example, the involute surfaces of gear teeth or the driving faces of splines and the methods of using the same.

In the manufacture of objects such as gears, splines and the like by use of a hobbing grinding machine it is periodically necessary to dress the helically threaded grinding wheel as said wheel wears out of shape through use. When the wear is sufficiently great the grinding wheel will not produce a finished workpiece within the specified tolerances and it must be dressed to reinstate the desired contour into its cutting face. The dressing of the grinding wheel is necessarily more important and frequent when the specified manufacturing tolerances are small. The common method presently employed of dressing the helically threaded grinding wheel is by completely removing it from the hobbing grinding machine and dressing it upon a separate machine particularly designed for that purpose, known to the art as a wheel threading machine. The dressed grinding wheel is then put back on the wheel arbor in the grinding machine and production started again. This operation is necessary each time the grinding wheel requires dressing.

My invention makes it possible for the grinding wheel to be speedily and accurately dressed without removing it from the grinding machine thereby permitting its continuous use on long production runs. Making use of the invention the grinding wheel can be continuously used until it becomes so small in diameter its further use becomes impractical. This is made possible by substituting a novel hobbing grinding wheel dressing tool into the hobbing grinding machine in place of the workpiece. The grinding wheel is then lowered slightly into the dressing tool and the hobbing grinding machine is run through its work cycle with the dressing tool in place of the workpiece. The dressing tool will trim a small part of the external surface of the grinding wheel in the amount the grinding wheel was lowered into the dressing tool and accurately redefine the contour of the helical threads of the cutting face. My invention provides a hobbing grinding wheel dressing tool which is adapted for use in dressing the helical threads of the grinding wheel without removing the grinding wheel from the hobbing grinding machine and the method of dressing the helical threads of the grinding wheel with the same.

The invention comprises a dressing tool base member which is slightly smaller than the finished workpiece being produced and of substantially the same peripheral contour, having a plurality of shaping diamonds or diamond particles disposed about its dressing surfaces arranged so that the effective peripheral contour of the cutting edges of said shaping diamonds or diamond particles is the same as that of the specification for the finished workpiece which it is desired to produce. When the grinding wheel dressing tool is placed upon the work arbor in a hobbing grinding machine in place of the workpiece its diamond cutting surfaces, having the same effective peripheral contour as the specification for the finished workpiece being produced, will accurately and quickly dress the grinding wheel. When the dressing tool is replaced with an unfinished workpiece, such as a gear blank, the grinding wheel in a complete work cycle of the grinding machine, will reproduce a finished workpiece to specification. My invention also contemplates the method of dressing the grinding wheel making use of said grinding wheel dressing tools, and a method of making such tools.

Advantageous embodiments of the present invention are described below and are shown in the accompanying drawings in which:

Fig. 3 is a cross-sectional view of the grinding wheel dressing tool on line 3—3 of Fig. 2;

Fig. 4 is a cross-sectional view of the grinding wheel dressing tool on line 4—4 of Fig. 3;

Fig. 5 is an enlarged partial sectional view on line 5—5 of Fig. 3;

Fig. 6 illustrates the diamond mountings used in a specific embodiment of the invention.

Figure 1:
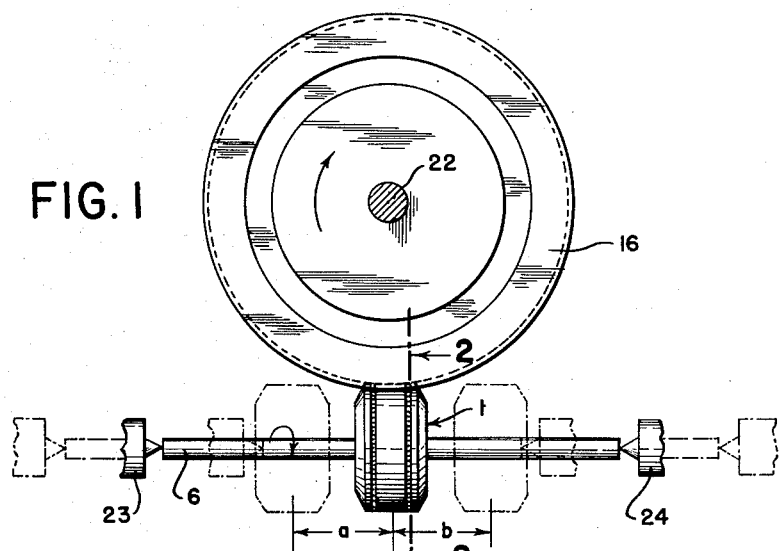
Fig. 1 is a schematic elevation of the dressing tool on the work arbor in grinding engagement with the grinding wheel and showing the work cycle of the hobbing grinding machine.

Reference is now made to the accompanying drawings in which like characters of reference indicate the same parts in different views. The specific embodiment of a grinding wheel dressing tool shown in Figs. 2–6 is adapted to dress hobbing grinding wheels used to grind the involute surfaces of gear teeth. The assembled dressing tool 1 comprises four circular gear-shaped members 2, 3, 4 and 5 which are integrally mounted on the work arbor 6. The assembled dressing tool 1 is affixed to collar 7 which is fixedly mounted on the work arbor 6 by means of bolting gear-shaped member 3 to said collar 7 by means of bolts 8. Gear-shaped members 2 and 4 are bolted to gear-shaped member 3 by means of bolts 9 and 10. Gear-shaped member 5 is bolted by bolts 11 to gear-shaped member 4. The assembled dressing tool 1 may be removed from the work arbor 6 as a unit by merely removing bolts 8. When the gear-shaped members 2, 3, 4 and 5 are integrally assembled upon the work arbor 6 there are two annular recesses 12 and 13 left between gear-shaped members 2 and 3 and between gear-shaped members 4 and 5 respectively. Said annular recesses 12 and 13 contain three-sided grooves 18, such as shown in Fig. 5, cut into surfaces of gear-shaped members 3 and 4. Said three-sided grooves 18 are for the purpose of positioning the cutting diamond mountings 14 about the peripheral contour of the dressing tool 1. Said cutting diamond mountings 14 are illustrated in Fig. 6 in which a chisel-shaped cutting diamond 15 is placed within the pencil-shaped shaft 25. Said cutting diamonds 15, seventy-two in number in the specific embodiment, are arranged about the annular recesses 12 and 13 so that the cutting surfaces of said diamonds 15 will produce the peripheral contour desired to be reproduced in the grinding wheel 16 and ultimately in the finished gears being manufactured.

Figure 2:
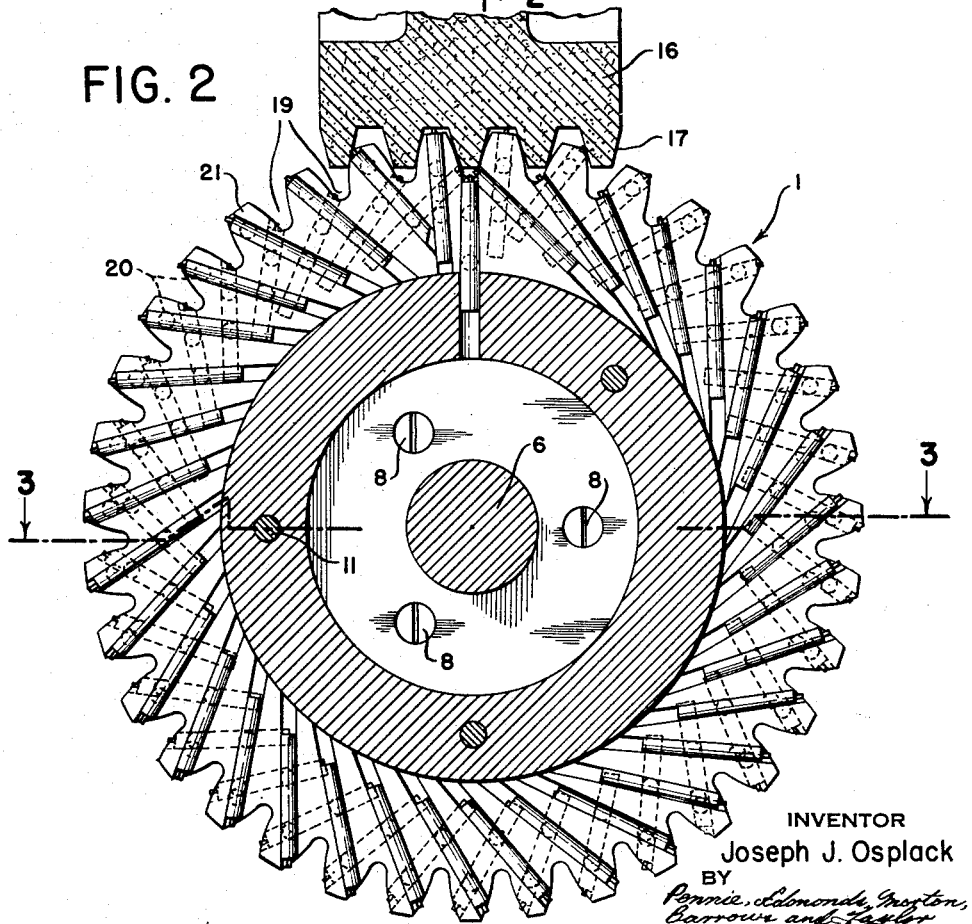
Fig. 2 is an enlarged cross-sectional view on line 2—2 of Fig. 1.

Fig. 2 shows the arrangement of the cutting diamond mountings 14 about the peripheral contour of the dressing tool 1 and the manner in which said cutting diamonds 15 come into dressing engagement with the helical cutting threads 17 of the hobbing grinding wheel 16. During the work cycle of the grinding machine the dressing tool 1 will rotate to the right in engagement with the helical cutting threads 17 of the rotating grinding wheel 16. Said helical cuutting threads 17 will pass through the V-ways 19 between the gear teeth 21 of the dressing tool 1 as said dressing tool 1 rotates to the right and moves longitudinally along the axis of the work arbor 6 passing under and through the grinding wheel 16. In a complete work cycle of the grinding machine the dressing tool 1 when in grinding engagement with the helical cutting threads 17 of the grinding wheel 16 will expose the entire length of the cutting threads 17 of the grinding wheel 16 to the cutting surfaces of the chisel-shaped cutting diamonds 15. The cutting diamonds 15 may advantageously be provided with straight line cutting edges. Cutting diamond 15a is positioned so that it will dress that portion of the helical threads 17 on the grinding wheel 16 that is to cut the bottom of the tooth on the production gear. The remaining cutting diamonds 15b, c, etc. (seventy-two in number in the specific embodiment) are dispersed about the contour of the gear teeth 21 of the dressing tool so that the chisel-shaped cutting edges of the diamonds 15 will produce the desired peripheral contour in the grinding wheel 16 and ultimately in the finished gear.

Figs. 3 and 4 further illustrate the positioning of the diamond mountings 14 about the dressing tool. The diamonds 15 that will dress one side of the helical thread 17 of the grinding wheel 16 are positioned in one annular recess, 12 or 13, in the dressing tool 1 while the diamonds 15 which dress the other side of the helical thread 17 are positioned about the other annular recess, 12 or 13. Fig. 4 shows one set of diamond mountings 14.

Fig. 5 illustrates a suitable means for fixing the cutting diamond mountings 14 in the proper position in the annular recesses 12 and 13. The three-sided grooves 18 are cut in the surfaces of gear-shaped members 3 and 4 at the proper angle and position so that the diamond mountings 14 will be properly positioned about the peripheral contour of the dressing tool 1. The diamond mountings 14, such as shown in Fig. 5, are placed longitudinally within the three-sided grooves 18. Bolts 20 in gear-shaped members 2 and 5 are tightened to hold each diamond mounting 14 fixedly in the proper longitudinal position in grooves 18 when that proper position has been attained.

In operation the hobbing grinding wheel 16 is rotatably mounted on the wheel arbor 22 as shown in Fig. 1. The wheel dressing tool 1 at the beginning of the work cycle is in position *a* integrally mounted upon the work arbor 6 which is rotatably mounted between work arbor centers 23 and 24. As the work cycle of the machine commences the dressing tool 1 is automatically rotated to the right in timed relation to the rotating grinding wheel 16. The helical cutting thread 17 on the grinding wheel 16 passes through the V-ways 19 of the dressing tool 1 and at the same time the dressing tool 1, the work arbor 6, and work arbor centers 23 and 24 move longitudinally to the right along the longitudinal axis of the work arbor 6 from position *a* to position *b*. The entire length of the helical cutting thread 17 upon the grinding face of the grinding wheel 16 will be dressed in one work cycle of the grinding machine. The dressing tool 1 is then removed, the work arbor 6 and work arbor centers 23 and 24 returned to position *a*, and a gear blank is substituted in place of said dressing tool 1 upon the work arbor 6. Thereafter, until dressing is again required, each complete work cycle of the grinding machine will produce a finished gear having a contour similar to the specified contour of the dressing tool 1.

Figure 7:
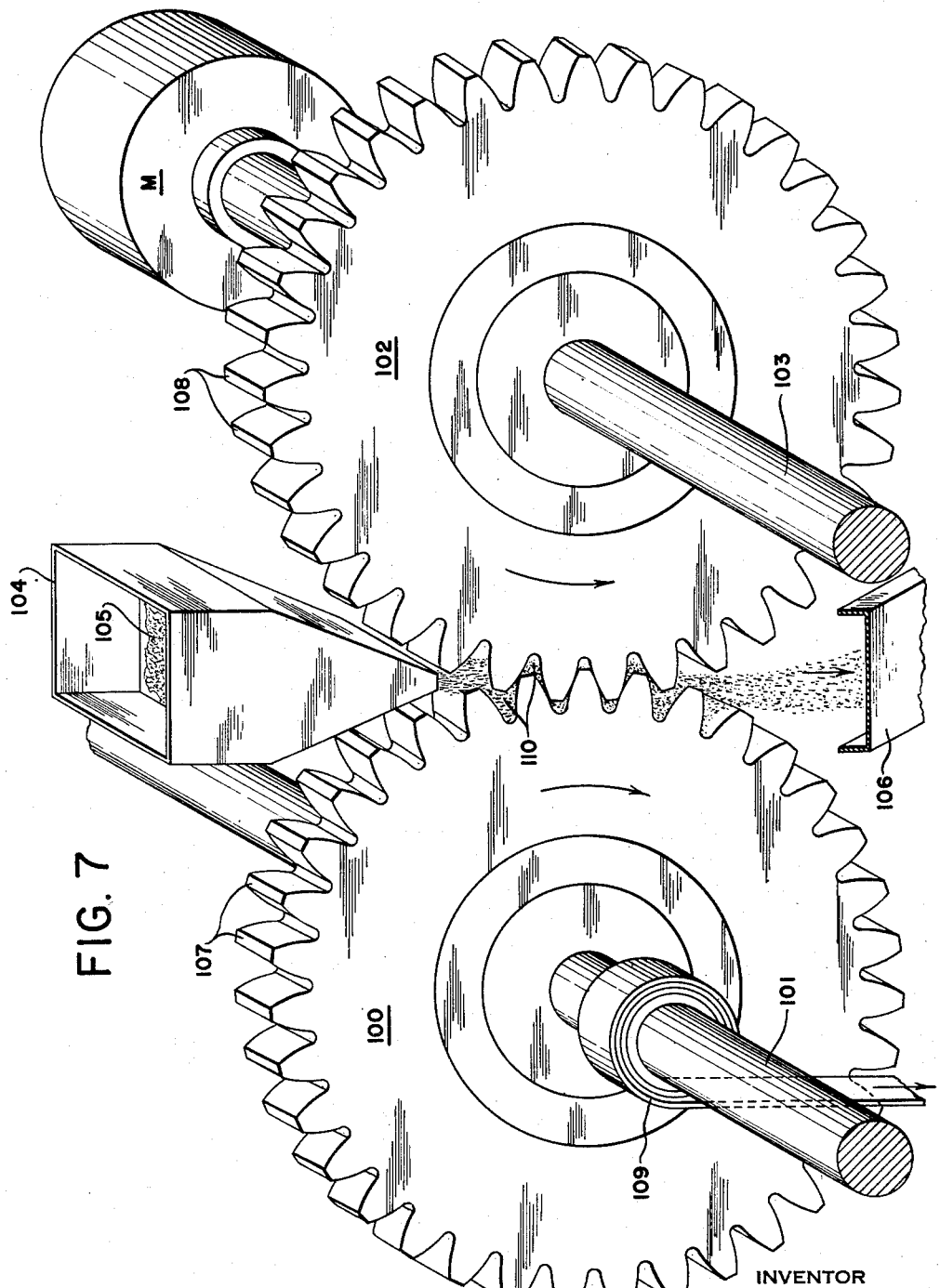
Fig. 7 is a perspective view of a soft bronze hobbing grinding wheel dressing tool being impregnated with diamond dust.

Fig. 7 shows another specific embodiment of the invention in which a relatively soft metallic dressing tool base member 100 is mounted upon spindle 101. Said base member 100 is preferably made of bronze. A hard steel gear 102 of master quality is mounted upon power spindle 103 which is slowly driven by motor M. A hopper 104 contains diamond dust or diamond particles 105. A collecting receptacle 106 collects the excess diamond particles or dust.

The finished bronze dressing tool is prepared for use in the dressing of the grinding wheel 16 by the act of rotating the bronze base member 100 and the hard steel gear 102 together in meshing engagement and at the same time dropping diamond dust or particles 105 into the spaces 110 between the meshing surfaces of the teeth 107 of the soft bronze base member 100 and the teeth 108 of the hard steel gear 102. The meshing of the gear teeth 107 and 108 causes the diamond dust or particles 105 to become impacted into the surfaces of the gear teeth 107 of the bronze base member 100 in the same contour as that of the hard steel gear 102. A strap 109 is arranged to wind on the spindle 101 as it rotates. Said strap 109 is attached to a weight or frictional drag means, not shown, to produce a torque resistance in the soft bronze base member 100 which requires a sufficient driving force in steel gear 102 to cause the impacting of the diamond dust or particles 105 into the surfaces of the teeth 107 of the bronze base member 100. The bronze base member 100 with the diamond dust or particles 105 impacted along the surfaces of its teeth 107 may then be used interchangeably as a dressing tool in a hobbing grinding machine in place of the specific embodiment illustrated in Figs. 2–6.

It is understood that while the specific embodiments shown in the drawings and described herein are adapted to dress grinding wheels used in the production of the involute surfaces of gear teeth the invention can be equally advantageously used in the dressing of grinding wheels used in the production of any object which can be produced by a hobbing grinding process. It will be necessary in each case to adapt the dressing tool to a shape and form whereby its effective peripheral contour will be identical to that of the finished object which is to be produced.

While I have described hobbing grinding wheel dressing tools and the method of using the same, it is understood that the drawings and description are to be interpreted in an illustrative rather than a limiting sense, since various modifications may be made within the spirit and scope of the invention defined by the appended claims.

I claim:

1. A dressing tool for grinding wheels which are used for grinding predetermined peripheral contours on workpieces by hobbing, comprising a gear-shaped base member having a plurality of teeth and at least two cutting diamonds on each tooth thereof, each diamond on each tooth being positioned in one of two planes perpendicular to the longitudinal axis of the base member, said diamonds being progressively placed around the contour of the teeth so that the cutting edges of the diamonds in one plane effectively trace the contour of one-half of a single tooth, while the diamonds in the other plane effectively trace the contour of the other half of said single tooth.

2. A dressing tool according to claim 1 wherein the cutting diamonds have a straight line cutting edge.

3. A dressing tool according to claim 1 wherein the cutting diamonds are adjustably affixed to said gear-shaped base member so as to permit their cutting edges to be so positioned as to lie exactly on the theoretical peripheral contour to be generated on a finished workpiece.

4. A dressing tool according to claim 3 wherein the cutting diamonds have a straight line cutting edge.

5. The method of dressing hobbing grinding wheels having a helical rib thereon used in producing workpieces having jagged peripheral contours comprising rotating a relatively soft metallic gear-shaped dressing tool base member in meshing engagement with a relatively hard metallic gear-shaped member of the same peripheral contour as the specification for the finished workpiece desired to be produced by the dressed hobbing grinding wheel, introducing diamond particles between the meshing teeth of said engaging gear-shaped members whereby said diamond particles will become impacted into the dressing surface of the relatively soft base member, the cutting edges of said impacted diamond particles having the same peripheral contour as the specification for the finished workpiece, placing said base member on the work arbor of a hobbing grinding machine and running the hobbing grinding machine through the work cycle to dress the hobbing grinding wheel.

References Cited in the file of this patent

UNITED STATES PATENTS

| | | |
|---|---|---|
| 153,568 | Husbands | July 28, 1874 |
| 1,022,692 | Meyers | Apr. 9, 1912 |
| 1,759,333 | Wildhaber | May 20, 1930 |
| 1,773,386 | Burgess | Aug. 19, 1930 |
| 1,902,555 | Hughes | Mar. 21, 1933 |
| 2,077,100 | Edgar | Apr. 13, 1937 |
| 2,136,359 | Bley | Nov. 15, 1938 |
| 2,226,608 | Gilmore | Dec. 31, 1940 |
| 2,377,241 | Kavle | May 29, 1945 |
| 2,394,326 | Newnham | Feb. 5, 1946 |
| 2,545,676 | Small | Mar. 20, 1951 |

FOREIGN PATENTS

| | | |
|---|---|---|
| 15,191 | Great Britain | Dec. 10, 1885 |
| 543,262 | Germany | Feb. 3, 1932 |